United States Patent [19]

Rouse

[11] Patent Number: 4,626,855
[45] Date of Patent: Dec. 2, 1986

[54] RADAR, SONAR AND SIMILAR SYSTEMS

[75] Inventor: David G. Rouse, Halstead, England

[73] Assignee: The Marconi Company Limited, Chelmsford, England

[21] Appl. No.: 664,935

[22] Filed: Oct. 25, 1984

Related U.S. Application Data

[63] Continuation of Ser. No. 305,344, Sep. 24, 1981.

[30] Foreign Application Priority Data

Sep. 27, 1980 [GB] United Kingdom ............... 8031288
Jul. 23, 1981 [GB] United Kingdom ............... 8122718

[51] Int. Cl.$^4$ ..................... G01S 13/28; G01S 13/66
[52] U.S. Cl. .................................... 342/201; 367/101
[58] Field of Search ................. 343/17.2 PC, 17.2 R, 343/17.1 R, 17.1 PF; 367/101

[56] References Cited

U.S. PATENT DOCUMENTS

| | | | |
|---|---|---|---|
| 3,243,814 | 3/1966 | Massey | 343/17.1 R |
| 3,905,033 | 9/1975 | Moore et al. | 343/7.7 |
| 3,945,011 | 3/1976 | Glasgow | 343/17.2 PC |
| 4,096,478 | 6/1978 | Chavez | 343/7.7 |
| 4,241,347 | 12/1980 | Albanese et al. | 343/17.2 PC X |

FOREIGN PATENT DOCUMENTS

| | | | |
|---|---|---|---|
| 0016597 | 1/1980 | European Pat. Off. | 343/17.2 PC |
| 0022410 | 1/1981 | European Pat. Off. | 343/5 W |
| 1344203 | 10/1963 | France | 343/17.1 PF |
| 2370988 | 6/1978 | France | 343/17.2 PC |
| 1073024 | 6/1964 | United Kingdom | 343/17.2 R |
| 1007516 | 10/1965 | United Kingdom | 343/17.2 R |
| 1047584 | 11/1966 | United Kingdom | 343/17.2 PC |
| 1056753 | 1/1967 | United Kingdom | 343/8 |
| 1095842 | 12/1967 | United Kingdom | 343/17.2 PC |
| 1114357 | 5/1968 | United Kingdom | 343/17.2 R |
| 1140590 | 1/1969 | United Kingdom | 343/17.1 R |
| 1473937 | 5/1977 | United Kingdom | 343/17.2 PC X |
| 1552877 | 9/1979 | United Kingdom | 343/17.2 PC |

Primary Examiner—T. H. Tubbesing
Assistant Examiner—Gilberto Barrón, Jr.
Attorney, Agent, or Firm—Spencer & Frank

[57] ABSTRACT

A radar apparatus which includes a transmitter that generates a train of pulses arranged in groups of two, each group including a long pulse and a short pulse of different frequencies. These long and short pulses are separated in a receiver by a range gate which passes the pulses through the upper receiving channel when reflected from long ranges and the lower receiving channel when received from short ranges. The upper channel includes a filter which passes only the long pulses, which are frequency swept, and then compressed. The lower channel includes a filter which passes only the short pulses which are not frequency swept. The transmitter reverses the order of the pulses in adjacent groups. Alternatively, both the long and short pulses may be frequency swept. In either event there are adjacent pairs of swept pulses in contrast to known systems in which each swept pulse has immediately been preceded or followed by an unswept pulse.

22 Claims, 2 Drawing Figures

RADAR, SONAR AND SIMILAR SYSTEMS

This application is a continuation of application Ser. No. 305,344, filed Sept. 24, 1981.

BACKGROUND OF THE INVENTION

This invention relates to a radar system which is defined for the purpose of this specification as apparatus for deriving information about the position or movement of a feature in a medium surrounding the apparatus by transmitting energy, through the medium, to a feature in said medium and observing the energy travelling to the said apparatus from the aforesaid feature. Whilst the invention is particularly applicable to apparatus which transmits and receives microwave radiation it is also applicable to acoustic or optical systems. Also, whilst the invention is particularly applicable to radar systems which sense the direction and time of arrival of the energy it is also applicable to systems which sense just the direction or just the time of arrival. It is also applicable to equipment which observes a Doppler shift between the transmitted and received signals. The term "radar" thus includes range finders, direction finders, and speed measuring equipment.

The invention particularly relates to radar systems employing pulse compression. In such a system a relatively long pulse is modulated before transmission, e.g., by sweeping its frequency from one value to another between the beginning and end of the pulse. On reception, the modulation of the pulse allows it to be compressed into a short time period. The use of pulse compression allows the transmission of a pulse which, because of its relatively long duration, has a relatively high energy whilst avoiding a loss of range resolution which would ordinarily be expected with an increase in pulse length.

When a pulse is received after reflection from two features at slightly different ranges, the received echoes of this pulse may overlap in time. The pulse compression system is normally able to separate such overlapping echo signals. However, if the aforementioned features are at close range the received power may be so strong as to saturate initial stages of the receiver, causing it to behave non-linearly. This prevents the pulse compression system from operating properly and thus a close range target adjacent to another larger target or a large source of clutter may not be detected. This problem was discussed by Glasgow in U.S. Pat. No. 3,945,011 at the time when pulse compression was first being considered for use in civil aviation radars. The Glasgow Patent proposed a solution to the problem which involved the transmission of a short unswept pulse after each long swept pulse. The long pulses were used in the receiver after reflection from long range targets and were subjected to pulse compression whilst the short pulses were used when reflected from short range targets and were not subjected to pulse compression. The aforementioned problem was thus overcome.

It is a principal object of this invention to provide an alternative solution to the same problem as that dealt with by Glasgow and described above.

SUMMARY OF THE INVENTION

This invention provides radar apparatus comprising a transmitter for transmitting a train of pulses including some of a first type and some of a second type, the transmitter including means for modulating some of the pulses so as to allow pulse compression on reception, characterised in that the transmitter is constructed and arranged to apply said modulation to adjacent pulses of said pulse train.

The invention also provides radar apparatus comprising a transmitter adapted to transmit groups of pulses, each group containing pulses of different types, and to modulate the last pulse of one group and the first pulse of the next group in such a way that these pulses can be pulse compressed on reception.

The aforementioned modulation, which allows pulse compression on reception, is preferably a continuous frequency sweep but alternative possibilities are feasible. For example, a discontinuous frequency sweep (sometimes called a "staircase") or phase changes or even amplitude modulation can be used to achieve the same effect.

The aforementioned first and last pulses may be modulated (e.g. frequency swept) in the same way or in different ways. Modulation in different ways (e.g. by frequency sweeping in different directions or at different rates) facilitates separation of the pulses in the receiver.

The transmitter is preferably adapted to transmit in each alternate group of pulses a long modulated pulse followed by a short pulse and in each other group of pulses a short pulse followed by a long modulated pulse.

Certain advantages can be obtained if each group of pulses comprises a long, frequency swept, pulse preceded and followed by short pulses which are also frequency swept. In this case it is preferable for the short pulses to be swept in opposite directions or with different rates of sweep to facilitate separation thereof in the receiver.

In order to increase the pulse repetition frequency of the short pulses, additional short pulses may be inserted between the groups.

The individual pulses of each group may be separated by a time interval though this is not necessary if they have sufficiently different characteristics (e.g. frequency) to allow separation in the receiver. If there is a time interval between pulses of a group, this is preferably but not necessarily less than the time intervals between groups of pulses.

According to another aspect of the invention there is provided a transmitter adapted to transmit during groups of periods each group containing periods of first and second different types of transmission and to modulate or code the transmission during the last period of one group and the first period of the next group in such a way that the signal transmitted during these first and last periods can be pulse compressed on reception and a receiver adapted to distinguish between received signals of the said different types and between signals received after reflection from features in first and second range zones, the receiver, when in operation, using received signals of the first type to give an indication of the positions of pulses in the first range zone and received signals of the second type to give an indication of the positions of features in the second range zone, the receiver including a pulse compressor for compressing received signals which are modulated or coded as aforesaid.

According to another aspect of the invention there is provided a transmitter for producing a transmission including some periods when there is a transmission of a first type and other periods when there is a transmission of a second type, the transmitter including means for coding or modulating the signals during some of the periods so as to allow pulse compression on reception, and a receiver adapted to distinguish between received signals of the respective different types and between signals received after reflection from different range zones, the receiver, when in operation, using signals of the first type to give an indication of the positions of features in a first range zone and the signals of the second type to give an indication of the positions of features in a second range zone; the receiver including a pulse compressor for compressing those received signals which were coded or modulated as aforesaid and the transmitter being constructed and arranged so as to apply said coding or modulation to adjacent signal periods.

DESCRIPTION OF THE PREFERRED EMBODIMENTS

Figure 1:
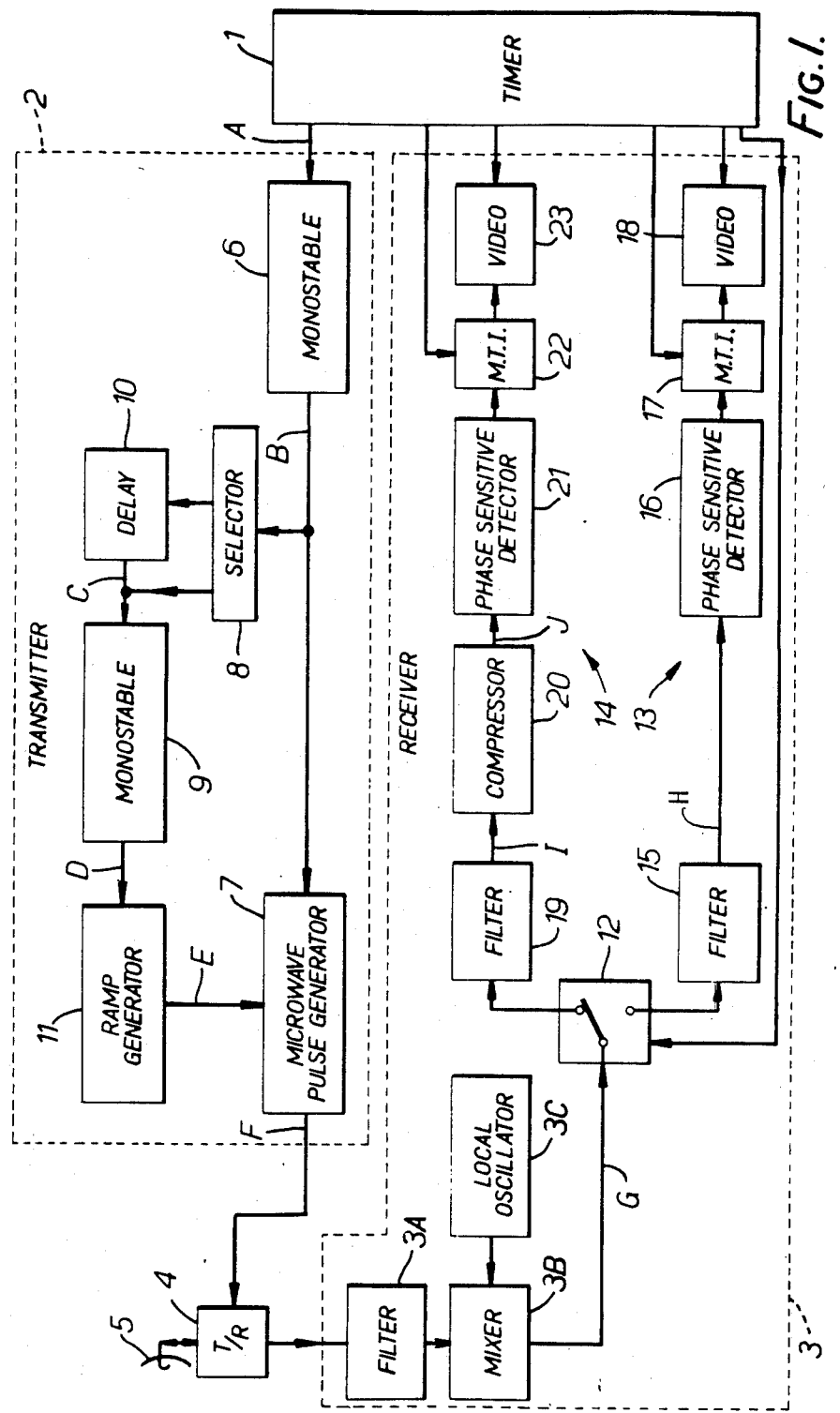
FIG. 1 is a schematic block diagram of one particular radar constructed in accordance with the invention.

Referring first to FIG. 1, the radar comprises a timer 1, a transmitter 2, a receiver 3, a T/R cell 4 and an antenna 5.

Figure 2:
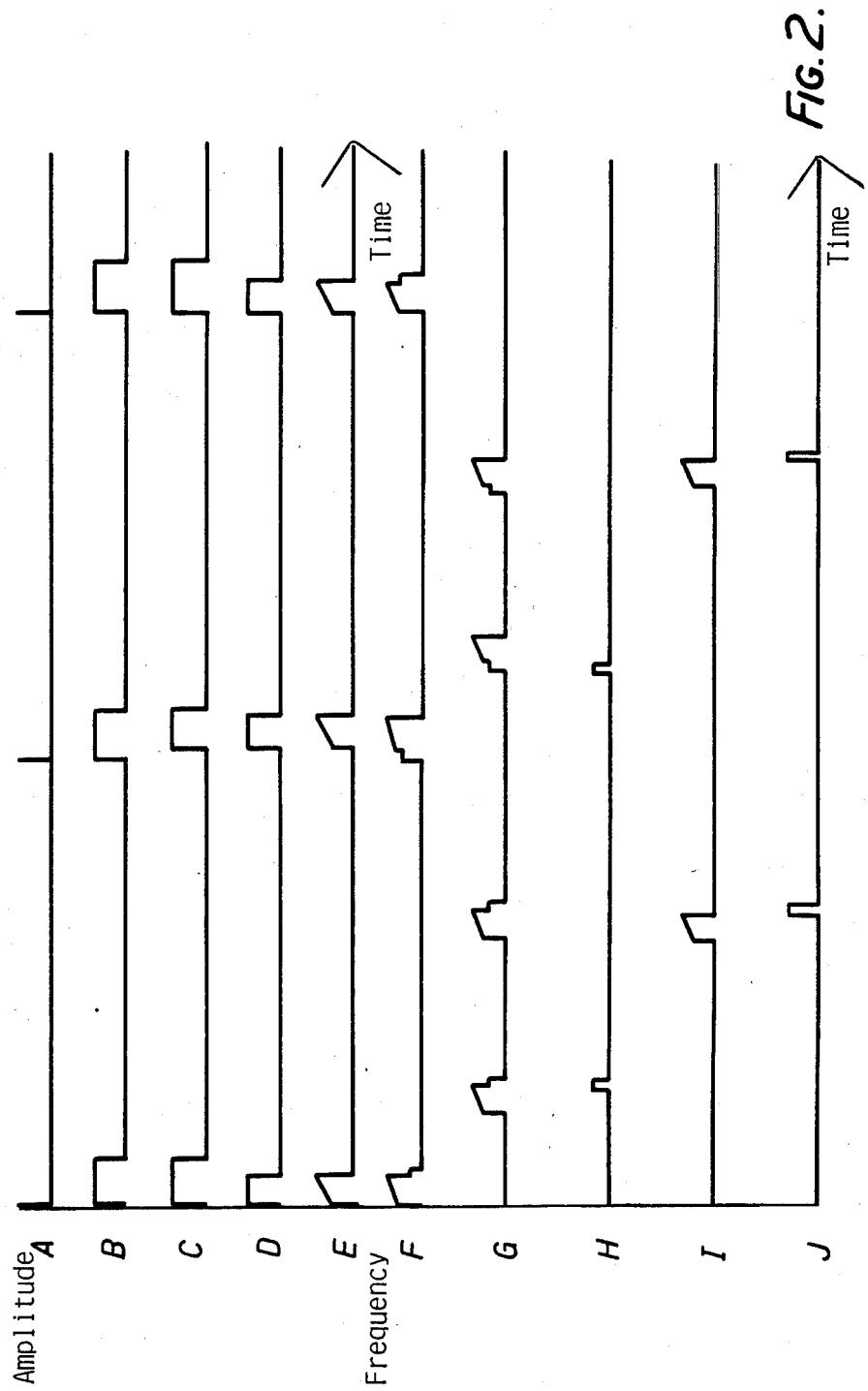
FIG. 2 shows, at A to J, waveforms appearing at points dented by respective reference letters on FIG. 1.

The transmitter receives timing signals A from the timer 1 and these timing signals are passed to a monostable circuit 6 which produces pulses B as shown on FIG. 2. The pulses B are passed to the drive circuit of a microwave pulse generator 7 which is caused to generate a microwave frequency output during the period of each pulse B.

Pulses B are also fed to a selector 8 which passes alternate pulses directly to a monostable circuit 9 whose period is slighlty less than that of the monostable 6. The other alternate pulses are fed indirectly to the monostable circuit 9 via a delay line 10. Thus the waveform at point C is as shown in FIG. 2 where alternate pulses are slightly delayed with respect to the timing pulses A.

The pulses D are passed to a ramp generator 11, which produces pulses E whose timing is similar to that of pulses D, but whose amplitude increases with time. The pulses E are passed to a control input of the microwave generator 7 and serve to increase its frequency by an amount depending on the voltage at the control input. Thus the output frequency of the generator 7 is, during the periods of pulses E, swept through a range of frequencies slightly above the basic frequency of the microwave generator 7, i.e., the frequency at which it operates when no control pulse is present at its control input. The output of the microwave generator is thus as shown at F on FIG. 2. It should be noted that waveforms F to J on FIG. 2 are plots of frequency against time in contrast to waveforms A to E which are plots of amplitude against time.

The microwave generator 7 is a voltage controlled oscillator followed by an amplifier. The voltage controlled oscillator can be a PIN diode.

Referring to waveform F it will be seen that this consists of spaced pairs of groups of pulses, each pair comprising a relatively long frequency swept pulse for a period defined by a monostable 9, immediately adjacent, without any time spacing, a relatively short, unswept pulse whose period or length is defined by the difference in periods of monostables 6 and 9. Furthermore it will be noted that in this particular embodiment of the invention the order of the long and short pulses is reversed in alternate pairs of pulses which means that the frequency or means frequency of consecutive pulses does not change between pulse pairs. The pulses generated by the microwave generator 7 are passed through the T/R cell 4 and are transmitted as electromagnetic waves into the surrounding medium by an antenna 5.

Reflections of the transmitted pulses are received by the same antenna 5 and passed through the T/R cell 4 to the receiver 3. In the receiver, they pass through a filter 3A and a mixer 3B where they are mixed with a frequency from a local oscillator 3C. Waveform G on FIG. 2 shows signals received from two targets at different ranges. These are separated by a range gate 12 into channels 13 and 14 for short range and long range returns respectively. The short range channel 13 incorporates a filter 15 which filters out the frequency swept pulses to leave the short unswept pulses as shown at H. These are detected by circuit 16 and then passed through a moving target indicator circuit 17, which can operate according to any known principle, for example, using additional range gates and Doppler filters or using a delay line canceller. The effect of the circuit 17 is to remove all pulses derived from stationary targets which are assumed not to be of interest. The circuit 17 receives a reference timing signal from the timer 1. The output of the moving target indicator circuit 17 is passed to a video display system 18, which also receives timing signals from the timer 1, to control the timing of successive scans.

The channel 14 has a filter 19 which removes the short unswept pulses leaving only the swept pulses as shown at I on FIG. 2. These swept pulses are subjected to pulse compression in a circuit 20, the output of which is shown at J. The output J is subjected to a treatment similar to that of pulses H, by a detector 21, a moving target indicator circuit 22 and a video display 23.

It will readily be seen from FIG. 2F that, because of the reversal of the order of the long and short pulses in successive pulse-pairs, the period between successive short pulses and successive long pulses can have one of two values. There are thus two pulse repetition frequencies. This is known as p.r.f. staggering and is introduced deliberately in known radar systems to prevent blind spots in a manner known per se, e.g., as explained in the 1962 edition of Skolnik's book "Introduction to radar systems" on page 131. The timing signals supplied to the video display and the MTI circuits need to take this staggered p.r.f. into consideration.

Another advantage accrues from the use of the illustrated radar when there is a large source of clutter at a slightly closer or further range than a small close-range target. The return from such a source of clutter may saturate the common parts 3A, 3B and 3C of the receiver during periods when some of the short return pulses are being received from the target. These short pulse returns are thus lost in the receiver. However, since some of the long, swept pulses precede, and others follow the associated short pulse, it is assured that not all of the short pulse returns are lost.

It will be appreciated that the described embodiment of the invention is only one of many different forms that the invention can take. The invention is, for example, applicable to sonar systems. Also, whereas in the illustrated system the different types of pulses differ in frequency and in length, it would be possible in an alternative system for them to differ only in frequency or only in length or to have some other distinguishing characteristic. Another possible modification would be for each group of pulses to incorporate three or more pulses some or all of which are of different types. Another modification would be for the transmitter to produce groups of pulses similar to those shown in FIG. 2F but with the frequency sweep in opposite directions in adjacent groups. Another modification would be to use a single video system instead of the two systems shown at 18 and 23 in FIG. 1 so that targets of all ranges are displayed on one screen. In such an arrangement, it would be possible for the range gate 12 to be positioned at the ends of the channels 13 and 14 instead of at the beginning. In some radar applications, it is not necessary to have a video display and the video system shown at 17 and 23 could be replaced by some form of digital processing system.

In radar which scan only in azimuth (or only to a limited extent in elevation) and which are required to detect targets at very close ranges a problem may arise with the illustrated system in the case of close range targets which are overhead or nearly so. This is because the short pulses, which are used for detecting the close range targets have insufficient energy for the detection of targets which are offset more than by a certain angle from the boresight of the radar antenna. Targets which are overhead may well be offset from the boresight by a large angle and therefore to be detected at close ranges. This problem can to some extent be overcome by increasing the pulse length of the short pulses (whilst still keeping them shorter than the long pulses) and by applying pulse compression to the short and to the long pulses. A radar employing this principle could be like that shown in FIG. 1 except that the transmitter would need to be redesigned so as to apply a frequency sweep to all the pulses. These could include pulse pairs like those shown in FIG. 2 which are alternately a long pulse followed by a short pulse and vice versa: or they could include pulse pairs which are all the same. The receiver would be similar to that shown in FIG. 1 except that a second compressor would be needed between blocks 15 and 16.

We claim:

1. A pulse radar system comprising:
   a transmitter including:
      means for transmitting a train of pulses which are timed to form groups of pulses, each group containing long and short pulses;
      means for modulating at least the last pulse of one group and the first pulse of the next group, the modulation being of the type that will permit pulse compression upon reception of each modulated pulse; and
   a receiver for receiving the transmitted pulses after reflection from a target, said receiver including: means for compressing the received modulated pulses; first means for distinguishing between pulses received from long and short ranges; second means for distinguishing between said long and short pulses; and third means responsive to said first and second means for using said long pulses when received from said long ranges and said short pulses when received from said short ranges to distinguish between targets in long and short ranges, respectively.

2. A radar system according to claim 1, wherein said modulating means applies said modulation in the form of a frequency sweep.

3. A radar system according to claim 2, wherein said first and last pulses are each of the same length and said frequency sweep of said first and last pulses is in the same direction.

4. A radar system according to claim 1, wherein said means for transmitting transmits a train of pulses including alternating first and second groups of pulses, said first group including a modulated pulse of a first length followed by a pulse of a second length and the second group including a pulse of said second length followed by a modulated pulse of said first length.

5. A radar system according to claim 1, wherein said system operates at microwavelengths.

6. A radar system according to claim 1, wherein said pulses of each group are separated by an interval of time during which no transmission takes place.

7. A radar system according to claim 1, wherein said pulses of each group have no time interval between them during which no transmission takes place.

8. A radar system according to claim 1, wherein said pulses of different types include long and short pulses and said train of pulses includes a series of four consecutive pulses, the first and fourth of which are short and the second and third being modulated to allow pulse compression on reception.

9. A radar system according to claim 1, wherein said train of pulses includes a series of four consecutive pulses, the first and fourth of which are long and the second and third of which are short.

10. A radar system according to claim 1, wherein said train of pulses includes a series of four consecutive pulses, the second and third of which are short and the first and fourth of which are modulated to allow pulse compression on reception.

11. A radar system according to claim 1, wherein said means for transmitting modulates adjacent pulses in said train of pulses, the first of said adjacent pulses being preceded by a consecutive short pulse and the last of said adjacent pulses being followed by a consecutive short pulse.

12. A radar system comprising:
   a transmiter means for transmitting a train of pulses which are timed to form groups of pulses, each group containing long and short length pulses, said transmitter means alternately transmitting first and second groups of pulses, said first group including a first pulse of one said length followed by a last pulse of the other of said lengths and said second group including a first pulse of the other of said lengths followed by a last pulse of said one length, said transmitter means including means for modulating at least the pulses of said one length, the modulation being of the type which will permit pulse compression upon reception of each modulated pulse; and
   a receiver means for receiving the transmitted pulses after reflection from a target, said receiver means including: means for compressing the received modulated pulses; first means for distinguishing between pulses reflected from targets in different range zones; second means for distinguishing between said long and short pulses; and third means responsive to said first and second means for using said long pulses when received from long ranges and said short pulses when received from short ranges to distinguish between targets in said different range zones.

13. A radar system according to claim 12, wherein said pulses of each group are separated by an interval of time during which no transmission takes place.

14. A radar system according to claim 12, wherein there is no time interval between pulses of each group during which no transmission takes place.

15. A radar system according to claim 12, wherein said modulation is a frequency sweep.

16. A radar system according to claim 15, wherein said frequency sweep is in the same direction for each of said one length.

17. A radar system according to claim 15, wherein said frequency sweep is different for consecutive pulses of said one length.

18. A radar system according to claim 12, wherein said system operates at microwave frequencies.

19. A system according to claim 12, wherein said train of pulses includes a series of four consecutive pulses, the first and fourth of which are short, the second and third being modulated to allow pulse compression on reception.

20. A radar system according to claim 12, wherein first and second types of pulses are long and short pulses, said train of pulses includes a series of four consecutive pulses, the first and fourth of which are long and the second and third of which are short.

21. A radar system according to claim 12, wherein said train of pulses includes a series of four consecutive pulses, the second and third of which are short and the first and fourth of which are modulated to allow pulse compression on reception.

22. A radar system according to claim 12, wherein respectively, the long pulse of said second group is preceded by a consecutive short pulse, and the long pulse of said first group is followed by a consecutive short pulse.

* * * * *